April 21, 1931.   H. A. BEILGARD   1,801,537
RETRACTABLE LIGHT ASSEMBLY
Filed April 22, 1929   2 Sheets-Sheet 1

Inventor
HARVEY A. BEILGARD
By
Attorney

April 21, 1931.　　　H. A. BEILGARD　　　1,801,537
RETRACTABLE LIGHT ASSEMBLY
Filed April 22, 1929　　2 Sheets-Sheet 2
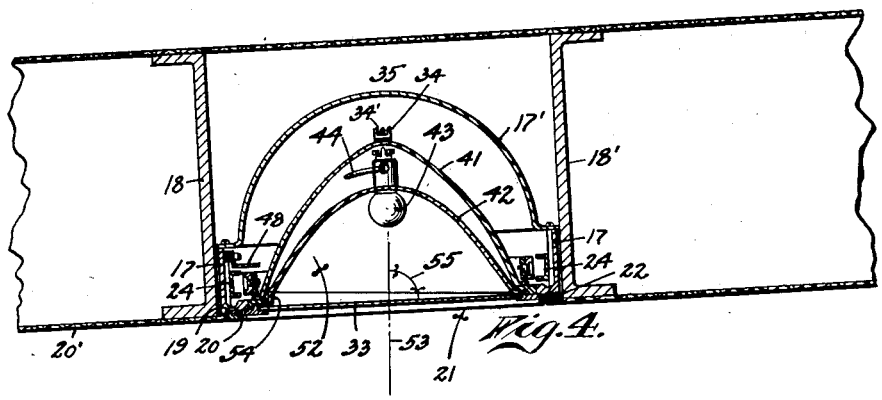
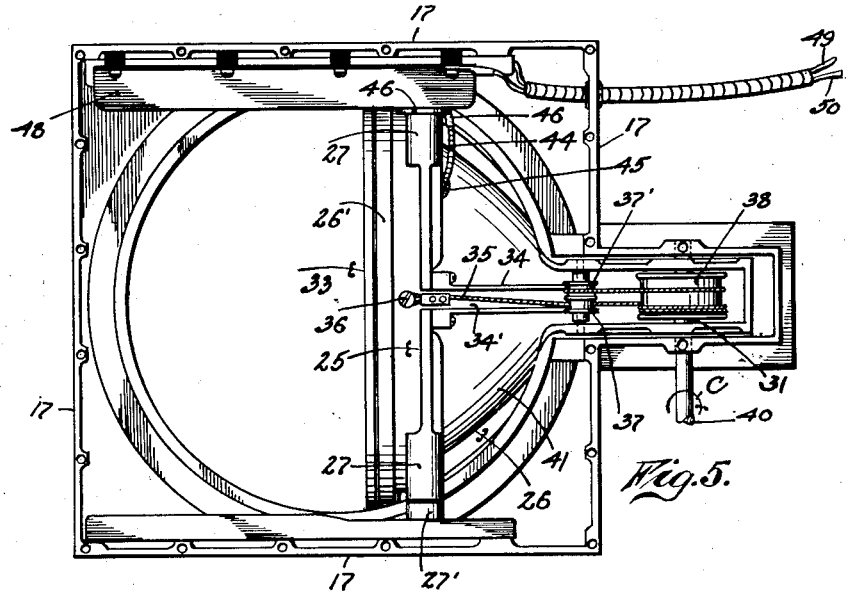
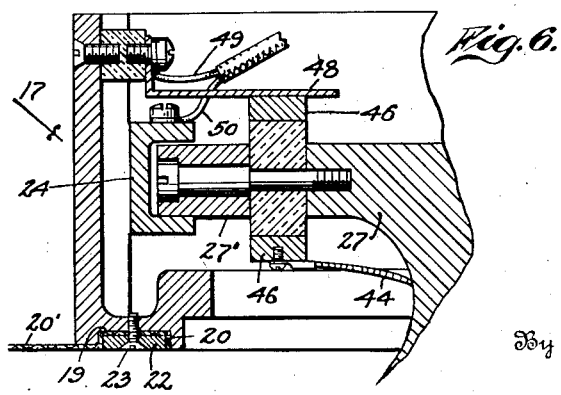
Inventor
HARVEY A. BEILGARD
Attorney Patented Apr. 21, 1931

1,801,537

UNITED STATES PATENT OFFICE

HARVEY A. BEILGARD, OF BEVERLY HILLS, CALIFORNIA

RETRACTABLE LIGHT ASSEMBLY

Application filed April 22, 1929. Serial No. 356,925.

This invention pertains to a lighting fixture which is especially adapted for use in connection with aircraft.

It is an important object of this invention to produce a lighting fixture of the class described, which is designed to be mounted within the aerofoil or wing of an airplane in a manner such that it is normally positioned with its lens substantially in a plane common to the lower surface of the aerofoil and is associated with operating means adapted to impart angular adjustment to the lamp so that it may be swung downwardly from the aerofoil to a position in which its lens is substantially perpendicular to the plane of the aerofoil.

In this former position the lamp is used in viewing the ground surface prior to landing and in the latter position it projects light forward ahead of the airplane to illuminate the field upon which the landing is being made.

It is a noteworthy feature of my invention that the lamp may be easily adjusted through various positions of angularity so that the proper portion of the landing field may be illuminated while the plane is being brought to the ground.

I am aware of the fact that the broad conception of mounting a lamp within the aerofoil of an airplane is not new, but my invention relates more particularly to certain novel features in the construction of lamp fixtures of this character, comprising improvements which lend to the lightness in weight of such lamp fixtures and which add to the ease with which they may be controlled.

In all of the so-called airplane landing lamps in present use, so far as I am aware, the lamp body is pivotally mounted, at a point near its rim, to a portion of the wing or aerofoil, making it necessary to force the lamp downward against the wind pressure and to hold the same against such wind pressure while it is being used for projecting light ahead of the aircraft. This necessitates the use of a lever system of considerable strength, which adds materially to the weight of the unit.

It is a primary object of my invention to provide a lamp of the class described with a supporting and operating structure arranged in a manner such that the wind pressure against the lens of the lamp will hold the same in an open position, and which construction is so arranged that when the lamp is partly closed, the wind pressure will assist in the further closing movement beyond a neutral or central position, whereby the required strength and resultant weight of the operating mechanism is greatly decreased.

This object of my invention is accomplished, in the form shown, by providing the lamp with a toggle support, which is attached to an intermediate point near the rim of the lamp. One edge of the lamp is attached to guide means which are adapted to slide in an opening provided in the aerofoil, so that the lamp body may be described as being adapted to receive movement in a manner such that the front of the lamp rim is retracted through, and the rear of the lamp rim is moved downward from the opening in the aerofoil during an "opening" operation.

It is a further important object of my invention to provide a lamp of the class described with a novel form of electrical contact which eliminates the use of moving wires in the aerofoil.

Another noteworthy feature of my invention is that the lamp construction embodies a housing which is adapted to be mounted between suitable beam members in the aerofoil and is so constructed as to receive and clamp an edge of the wing covering firmly against the rim of the housing.

It is common practice in the design of aircraft to form the wing members with a so-called lateral dihedral angle, that is, the wings are constructed and mounted upon the fuselage in a manner such that they taper upwardly from the vertical center line of the fuselage.

It will be apparent, therefore, if lamps provided with reflectors of the ordinary well known type were mounted in the wings of this character so that the lens of each lamp was in the plane of the lower surface of the wing within which it was mounted, that when the airplane was flying an appreciable distance above the ground, the light from these lamps would illuminate regions of the ground on opposite sides of the airplane, but would not provide illumination for the ground immediately below the plane upon which observation must be made.

It is therefore a further object of my invention to produce a lighting fixture of the class described, which is provided with a novel form of reflector adjustably mounted within the lamp body in a manner such that it can be positioned to project light vertically downward when the aircraft is flying in a horizontal plane. This I will term a dihedral reflector, since the axis of the reflecting section meets the lens of the lamp at an angle corresponding to what will be hereinafter referred to as the dihedral angle of the wing. The axis of this reflecting surface is therefore parallel with the vertical center line of the fuselage.

Other advantages of my invention and further objects attending its production will be better understood from the following description of the accompanying drawings, in which Fig. 1 is a front elevation of an airplane embodying my invention, showing the lamps as being mounted in the outer ends of the wings and illustrating the manner in which the light is projected vertically downward when the aircraft is flying in a horizontal plane.

Fig. 4 is a sectional elevation similar to Fig. 3, but showing the lamp as having been retracted into the aerofoil and illustrating the same in section to emphasize details in the construction of the dihedral reflector.

Fig. 5 is a plan section of a lamp embodying my invention, and may be considered as having been taken substantially in a plane represented by the line 5—5 in Fig. 2.

Fig. 6 is an enlarged partial sectional elevation which may be considered as having been taken substantially in a plane represented by the line 6—6 in Fig. 2.

Figure 1:
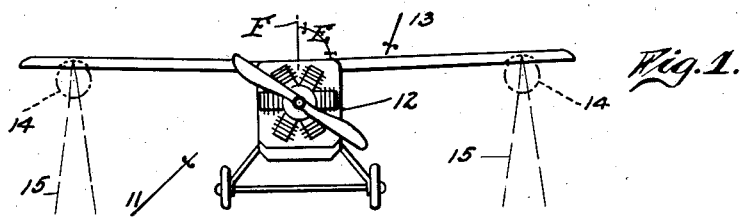

More particularly describing the invention as herein illustrated, reference numeral 11 indicates an airplane embodying a fuselage 12 and an aerofoil 13. The outer end portions of the aerofoil are shown as being provided with retractable lights, generally indicated by reference numeral 14.

It will be noted from Fig. 1 that the wings or aerofoil 13 slope upwardly from the fuselage 12, and reference numeral 15 indicates the manner in which lamps provided with my novel form of reflector project the light vertically downward when the airplane is flying in the horizontal plane.

The details in the construction of a preferred form of light assembly embodying my invention are best illustrated in Figs. 2 to 6, inclusive, wherein it will be noted that the light assembly embodies a housing 17, provided with a cover 17' and mounted in any preferred manner between oppositely disposed beam members 18 and 18', forming a part of the aerofoil.

The lower surface of the housing 17 is provided with a groove or channel 19, which receives an edge 20 of the wing or aerofoil covering 20', surrounding an opening 21 which will be hereinafter referred to as being formed in the lower surface of the aerofoil.

The edge 20 of the wing covering 20' is held in firm engagement with the channel or groove 19 by means of a locking strip or locking strips, generally indicated by reference numeral 22, such strips being retained upon the housing 17 in any suitable manner, such as by means of screws 23 (Fig. 6).

The housing 17 has provided upon its two inner surfaces, which are parallel to the direction of the motion of the aircraft, track members, generally indicated by reference numeral 24.

The track members are adapted to slidably receive what may be termed guide means 25, which are illustrated as being attached to a lamp 26 near the rim 26' thereof.

The guide means 25 consist of two oppositely disposed ears 27, which may be provided with rollers 27' adapted to be received by the tracks 24.

Figure 2:
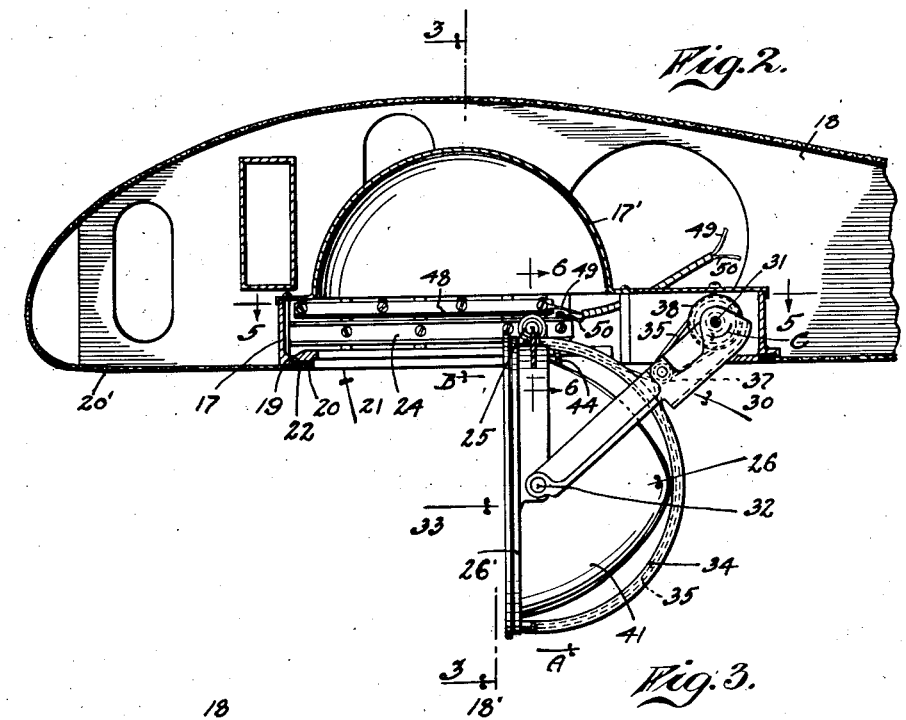
Fig. 2 is an enlarged sectional elevation, showing a preferred form of my invention and illustrating the lamp as having been moved downward into a so-called landing position.
Figure 3:
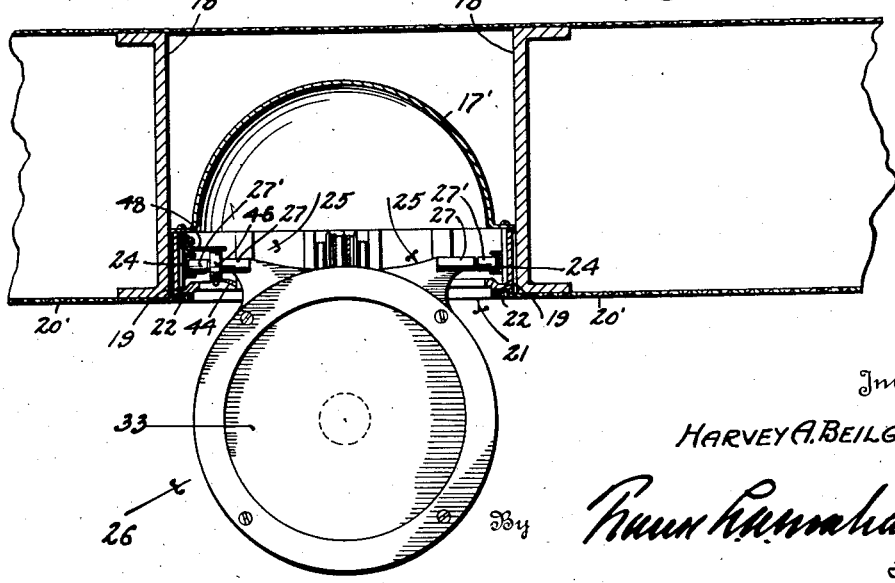
Fig. 3 is a sectional elevation which may be considered as having been taken substantially in a plane represented by the line 3—3 in Fig. 2.

A swinging bifurcated arm 30 is pivotally mounted within the housing 17 at 31, and the forked ends 32 of this arm are pivotally attached to the lamp at diametrically opposite points near the lens of the lamp in the manner as is perhaps best illustrated in Fig. 2.

It will be understood from this construction that, when the lamp is in the position illustrated in Fig. 2 (the pivot points 32 being centrally located near the lamp rim), the wind pressure against the lens 33 of the lamp, being applied uniformly over the entire area of the lens, is effective to hold the lamp structure in this position.

It will also be apparent that if a torque is applied to the lamp in the direction or the arrows A and B in Fig. 2, the lamp will be swung forwardly and upwardly to a position such that the rim of the lamp rests in the opening 21 in the lower surface of the aerofoil.

It will be apparent that various means may be employed to effect this rotating movement or angular adjustment of the lamp within the opening, but, for the purpose of economical construction and lightness in weight of the finished apparatus, I prefer to employ angular adjusting means, consisting of an arcuate member 34, which is mounted upon the back of the lamp in a plane perpendicular to the plane of the opening 21.

The arcuate member 34 is illustrated as being provided with a groove 34′, adapted to receive a cable 35, the opposite ends of which are attached to the arcuate member or to the rim of the lamp, as indicated at 36.

The cable 35 is illustrated as extending over rollers 37 and 37′ to a control pulley 38 to which it is fixed. It will be apparent from this construction that, when the pulley 38 is rotated in the direction of the arrow C in Figs. 2 and 5, the lower portion of the cable 35 will be drawn rearwardly in the direction of arrow A, such movement being effective to force the front of the lamp forward and to draw the rear of the lamp upward into the aperture 21.

For the purpose of effecting the movement of the pulley 38 referred to above, and the resultant adjustment of the lamp 26, I show the pulley 38 as being mounted upon the outer end 31 of a rotatable shaft 40 which extends across the wing of the airplane to the cockpit, where it may be provided with any suitable form of operating means, such as a lever or a crank (not shown).

It will be apparent that means other than the arcuate member and the cable system might be substituted for the purpose of operating the lamp 26; for instance, the arcuate member may be made as a segmental gear and the shaft 40 may be provided with a pinion or suitable gears to effect the same result.

The construction of the lamp 26 is best illustrated in Fig. 4, where it is shown as comprising an outer shell or body 41 which encloses a reflector 42, the reflector in turn being adapted to receive a bulb 43.

Electric current is conducted to the bulb 43 from any suitable source through a flexible conductor 44, which passes through a suitable aperture 45 in the outer shell 41 of the lamp 26. The conductor 44 is connected with a sliding contact member 46, which is illustrated as being mounted adjacent to one of the guide rollers 27′.

A stationary contact strip 48 is mounted upon one of the track members 24 in a position such that it is in sliding engagement with the contact member 46, and is separated from the track member by suitable insulation.

This construction is best illustrated in Fig. 6, and it will be understood that at all times during which an electrical circuit through the conductors 49 and 50 is closed, the bulb 43 is illuminated. This construction eliminates the use of a moving or bending flexible conductor in the aerofoil and provides means whereby the bulb can be illuminated at all times during the adjustment of the lighting fixture.

It has been previously pointed out that the common practice in the design of aircraft is to provide the wings or aerofoils with a slight lateral dihedral angle. Such angle, for the purpose of description and definition, will be indicated as the angle E in Fig. 1, or the angle formed between one of the wings of the airplane and the vertical axis of the fuselage.

It will be apparent, as was previously pointed out, that if lamps containing the ordinary type of reflector were mounted in the airplane wings in the manner illustrated in Fig. 1, in a position such that the lenses were in the same plane with the lower surface of the aerofoil, the light from the lamps would be thrown outwardly at angles away from the region directly below the airplane.

It is obviously necessary for the proper operation of a lighting fixture of this character, to form the lamp in a manner such that the light is directed vertically downward on a line substantially parallel with the vertical center line of the fuselage, and for the purpose of effecting such a reflecting of the light, I prefer to use a novel form of reflecting member 42, which is adjustably mounted in the housing 41 and has a reflecting section 52 arranged in a manner such that its center line 53 is substantially parallel with the vertical center line of the fuselage.

This reflector may be described as being formed with a dihedral rim 54, and may be defined as being positioned within the lamp body in a manner such that the center line 53 of the reflecting section 52 forms an angle 55 with the lens 33 of the lamp, which corresponds to the lateral dihedral angle E, which the airplane wing 13 makes with the vertical center line F of the fuselage.

It will be apparent from the foregoing description that my invention embodies a lighting fixture which, due to its novel type of reflector, its lightness in weight, its structural simplicity, and the ease with which it may be controlled, is particularly adapted for use in connection with airplanes.

The pivot support 31 for the arm 30, being positionally fixed with respect to the track 24, the lamp 26 being provided with guide means 25 which are in sliding engagement with the track 24, and the swinging arm 30 being pivotally attached at an intermediate point 32 near the rim 26' of the lamp, it will be apparent from Fig. 2 that this combination of elements forms a lighting fixture in which the lamp may be described as being supported by toggle means arranged in a manner such that the lamp is held in the perpendicular position shown in Fig. 2 by wind pressure against the lens 33 of the lamp.

It is to be understood that, while I have herein described and illustrated one preferred form of my invention, it is not limited to the precise construction set forth, but includes within its scope whatever changes fairly come within the spirit of the appended claims.

I claim as my invention:

1. A lighting fixture comprising: a lamp; a track; a guide in sliding engagement with said track and attached to said lamp near the rim thereof; a swinging arm pivotally attached to said lamp; and pivot means positionally fixed with respect to said track for supporting said arm.

2. A lighting fixture comprising: a lamp; a track; a guide in sliding engagement with said track and attached to said lamp near the rim thereof; a swinging arm pivotally attached to said lamp; pivot means positionally fixed with respect to said track for supporting said arm; a contact strip associated with said track; and a contact member on said guide in sliding engagement with said contact strip.

3. A lighting fixture comprising: a lamp; a track; a guide in sliding engagement with said track and attached to said lamp near the rim thereof; a swinging arm pivotally attached to said lamp; pivot means positionally fixed with respect to said track for supporting said arm; an arcuate member mounted on the back of said lamp; and means for imparting angular adjustment to said arcuate member.

4. A lighting fixture comprising: a lamp; a track; a guide in sliding engagement with said track and attached to said lamp near the rim thereof; a swinging arm pivotally attached to said lamp; pivot means positionally fixed with respect to said track for supporting said arm; an arcuate member on the back of said lamp; flexible means attached to opposite end portions of said arcuate member; and a pulley associated with said flexible means for imparting angular adjustment to said arcuate member.

5. A lighting fixture comprising: a housing; tracks mounted in opposite sides of said housing; a lamp; guide means in sliding engagement with said tracks and attached to said lamp near the rim thereof; a swinging bifurcated arm pivotally attached to diametrically opposite portions of said lamp near the rim of said lamp; and means for pivotally supporting said arm in said housing.

6. A lighting fixture comprising: a housing; tracks mounted in opposite sides of said housing; a lamp; guide means in sliding engagement with said tracks and attached to said lamps near the rim thereof; a swinging bifurcated arm pivotally attached to diametrically opposite portions of said lamp near the rim of said lamp; means for pivotally supporting said arm in said housing; an arcuate member mounted on the back of said lamp; and means for angularly adjusting said arcuate member.

7. A lighting fixture comprising: a housing; tracks mounted in opposite sides of said housing; a lamp; guide means in sliding engagement with said tracks and attached to said lamp near the rim thereof; a swinging bifurcated arm pivotally attached to diametrically opposite portions of said lamp near the rim of said lamp; means for pivotally supporting said arm in said housing; a contact strip associated with one of said tracks; and a contact member mounted on said guide in sliding engagement with said contact strip.

8. For use in combination with an aerofoil having an opening therein, a lighting fixture comprising: a lamp normally positioned with its rim in said opening; tracks on opposite sides of said opening; guide means in sliding engagement with said tracks and attached to said lamp near the rim thereof, said guide means being normally positioned toward the leading edge of said aerofoil; a swinging bifurcated arm pivotally attached to diametrically opposite portions of said lamp near the rim of said lamp; means positioned toward the rear edge of said aerofoil for pivotally supporting said arm and means for angularly adjusting said lamp in said opening.

9. For use in combination with an aerofoil having an opening therein: a lamp mounted in said aerofoil, normally positioned with its rim in said opening; and means for simultaneously moving the front portion of said lamp rearward through said opening, and the rear portion of the lamp downward from said opening.

10. For use in combination with an aerofoil having an opening therein: a lamp mounted in said aerofoil, normally positioned with its rim in said opening; toggle means for swinging said lamp downward from said opening, said toggle means being constructed in a manner such that the lamp is held in substantially perpendicular relation with said aerofoil by wind pressure against the lens of said lamp.

11. For use in combination with an airplane having airfoils sloping upwardly from the fuselage thereof; lamps mounted in said airfoils normally positioned with their lenses parallel with the bottom surface of said airfoils; means for simultaneously moving the front portions of said lamps rearwardly and the rear portions of said lamps downwardly with respect to said airfoils; and means for adjusting a beam cast from said lamps to compensate for the slope of said airfoils, said means including adjustable reflectors within said lamps.

In testimony whereof, I have hereunto set my hand at Los Angeles, California, this 17th day of April, 1929.

HARVEY A. BEILGARD.